United States Patent
Fujiwara et al.

(10) Patent No.: US 8,125,152 B2
(45) Date of Patent: Feb. 28, 2012

(54) LIGHT SOURCE APPARATUS AND LIQUID CRYSTAL DISPLAY

(75) Inventors: Masaru Fujiwara, Kanagawa (JP); Tsutomu Niimura, Kanagawa (JP); Makoto Natori, Kanagawa (JP)

(73) Assignee: Sony Corporation (JP)

( * ) Notice: Subject to any disclaimer, the term of this patent is extended or adjusted under 35 U.S.C. 154(b) by 1265 days.

(21) Appl. No.: 11/490,809

(22) Filed: Jul. 21, 2006

(65) Prior Publication Data
US 2007/0018557 A1 Jan. 25, 2007

(30) Foreign Application Priority Data

Jul. 22, 2005 (JP) .............................. P2005-212820
May 12, 2006 (JP) .............................. P2006-133290

(51) Int. Cl.
*H01J 17/20* (2006.01)
(52) U.S. Cl. ......................................... 313/637; 349/70
(58) Field of Classification Search .................. 313/637, 313/310, 311; 349/70; 315/307; 362/561
See application file for complete search history.

(56) References Cited

U.S. PATENT DOCUMENTS

| 5,923,129 A * | 7/1999 | Henry ............................ 315/307 |
| 2004/0130256 A1 | 7/2004 | Juestel et al. |
| 2004/0155226 A1 | 8/2004 | Choi |
| 2004/0264212 A1 | 12/2004 | Chung et al. |
| 2005/0141217 A1 | 6/2005 | Kim |
| 2006/0033860 A1 * | 2/2006 | Okishiro et al. ................ 349/70 |

FOREIGN PATENT DOCUMENTS

| JP | 8-286184 A | 11/1996 |
| JP | 9-222602 A | 8/1997 |
| JP | 2003-121838 A | 4/2003 |
| JP | 2004-139876 A | 5/2004 |
| JP | 2004-163902 A | 6/2004 |
| JP | 2004-294984 A | 10/2004 |
| JP | 2005-044756 A | 2/2005 |
| JP | 2005-353650 A | 12/2005 |

* cited by examiner

*Primary Examiner* — Peter Macchiarolo
*Assistant Examiner* — Mary Ellen Bowman
(74) *Attorney, Agent, or Firm* — Lerner, David, Littenberg, Krumholz & Mentlik, LLP

(57) ABSTRACT

A liquid crystal display and a light source apparatus capable of improving color reproduction compared to related arts without declining intensity. A light source apparatus includes: a cold cathode fluorescent tube including a B phosphor for blue and a G phosphor for green; and a light emitting diode for red, wherein the G phosphor emits a single-spectrum light with a peak wavelength of 510 to 530 nm, and the light emitting diode emits a single-spectrum light with a peak wavelength of 620 to 650 nm.

8 Claims, 11 Drawing Sheets

| | B COLOR | | G COLOR | | R COLOR | | | | NTSC RATIO (%) |
|---|---|---|---|---|---|---|---|---|---|
| | B PHOSPHOR | PEAK WAVE-LENGTH (nm) | G PHOSPHOR | PEAK WAVE-LENGTH (nm) | R PHOSPHOR | LED | PEAK WAVE-LENGTH (nm) | EXCITATION GAS | |
| COMPARATIVE EXAMPLE 1 (FIG. 8) | BaMgAl$_{10}$O$_{17}$BASE | 450 | LaPO$_4$:Ce,Tb | 545 | Y$_2$O$_3$:Eu | — | 613 | Hg | 74.9 |
| COMPARATIVE EXAMPLE 2 (FIG. 9) | BaMgAl$_{10}$O$_{17}$BASE | 450 | BaMgAl$_{10}$O$_{17}$BASE | 514 | YV$_4$O$_3$:Eu | — | 620 | Hg | 92.8 |
| EXAMPLE 1 (FIG. 3) | BaMgAl$_{10}$O$_{17}$BASE | 450 | BaMgAl$_{10}$O$_{17}$BASE | 514 | — | AlInGaP BASE | 638 | Hg | 101.3 |
| EXAMPLE 2 (FIG. 4) | BaMgAl$_{10}$O$_{17}$BASE | 450 | BaMgAl$_{10}$O$_{17}$BASE | 514 | — | AlInGaP BASE | 638 | Xe | 104.5 |
| EXAMPLE 3 (FIG. 5) | BaMgAl$_{10}$O$_{17}$BASE | 450 | Zn$_2$SiO$_4$:Mn | 525 | — | AlInGaP BASE | 638 | Xe | 98.0 |

FIG. 2

LIGHT SOURCE APPARATUS AND LIQUID CRYSTAL DISPLAY

CROSS-REFERENCE TO RELATED APPLICATIONS

The present application claims priority from Japanese Patent Application No. JP 2005-212820 filed in the Japanese Patent Office on Jul. 22, 2005 and Japanese Patent Application No. JP 2006-133290 filed in the Japanese Patent Office on May 12, 2006, the entire contents of which are incorporated herein by references.

BACKGROUND OF THE INVENTION

1. Field of the Invention

The present invention relates to a light source apparatus emitting white light, and a liquid crystal display using such a light source apparatus.

2. Description of the Related Art

In current television receivers (TVs), NTSC (National Television System Committee) system color displays are standard. When the color reproduction range of a display is narrower than that of NTSC, an image with a narrower color range than the colors of original signals is displayed, thereby the dynamic range is impaired to cause degradation in image quality. Recently, in a liquid crystal display (LCD) which is a kind of display, the expansion of the color reproduction range has been attempted.

As an indicator of the color reproduction range, a so-called NTSC ratio is used. The NTSC ratio is a ratio of the area of a color range which can be reproduced by a display with respect to the area of the reproduction range of NTSC in an xy chromaticity diagram, and the NTSC ratio is represented by the following formula (1):

$$\text{NTSC ratio (\%)} = (\text{area } S \text{ of triangle of display})/(\text{area } S_N \text{ of NTSC triangle}) \quad (1)$$

A specific method of calculating the NTSC ratio will be described below.

The area S of a triangle representing the color reproduction range in a chromaticity diagram is determined by the following formulas (2) through (6):

$$\text{Side } RG = [(XR-XG)^2 + (YR-YG)^2]^{1/2} \quad (2)$$

$$\text{Side } GB = [(XG-XB)^2 + (YG-YB)^2]^{1/2} \quad (3)$$

$$\text{Side } BR = [(XB-XR)^2 + (YB-YR)^2]^{1/2} \quad (4)$$

$$\text{Half-perimeter } P = (\text{side } RG + \text{side } GB + \text{side } BR)/2 \quad (5)$$

$$\text{Area } S = [\text{half-perimeter } P]^{1/2} \quad (6)$$

In this case, (XR, YR), (XG, YG) and (XB, YB) represent the vertex coordinates of red (R), green (G) and blue (B) (R chromaticity point, G chromaticity point and B chromaticity point), respectively in the triangle in the chromaticity diagram. The sides RG, GB and BR represent a distance between the R chromaticity point and the G chromaticity point, a distance between the G chromaticity point and the B chromaticity point and a distance between the B chromaticity point and the R chromaticity point, respectively. In the NTSC system, each vertex coordinate is as follows, so the area $S_N$ is $S_N$=0.157.

XR=0.67, YR=0.33

XG=0.21, YG=0.71

XB=0.14, YB=0.08

On the other hand, the vertex coordinates (chromaticity points) of a triangle representing the color reproduction range of a target liquid crystal display panel is determined from spectrum data as follows. Assuming that CIE1931 XYZ color matching functions are $x(\lambda)$, $y(\lambda)$ and $z(\lambda)$, and the spectrum of a backlight source is, $P(\lambda)$, and the spectral transmittance of each color filter of the LCD panel is $T(\lambda)$, tristimulus values (X, Y, Z) are determined by the following formulas (7) through (9). In the formulas, λ represents the wavelength of light.

$$X = \int p(\lambda) x(\lambda) T(\lambda) d\lambda \quad (7)$$

$$Y = \int p(\lambda) y(\lambda) T(\lambda) d\lambda \quad (8)$$

$$Z = \int p(\lambda) z(\lambda) T(\lambda) d\lambda \quad (9)$$

The ratios x, y and z of an X component, a Y component and a Z component are determined from these tristimulus values.

$$x = X/(X+Y+Z)$$

$$y = Y/(X+Y+Z)$$

Then, (x, y) of each color is plotted as each chromaticity point (XR, YR), (XG, YG) or (XB, YB), thereby a triangle representing the color reproduction range of the liquid crystal display panel can be obtained. The area S of the triangle is determined by the above-described formulas (2) through (6), and the NTSC ratio is determined by the formula (1).

In a transmissive illumination system liquid crystal display, as a backlight source, a cold cathode fluorescent tube (CCFL-tube) emitting white light has been heavily used hitherto. In the CCFL tube of this kind, in general, an R phosphor, a G phosphor and a B phosphor which emit R light, G light and B light, respectively are applied to an inner tube wall surface, and ultraviolet radiation generated by exciting a sealed noble gas or the like excites each phosphor to emit each color light.

However, in a liquid crystal display using a CCFL tube in related arts as a light source, there is an issue that mainly due to its light source emission spectrum, the NTSC ratio is low, thereby the color range is narrow, or an issue in color balance. More specifically, the color B does not have an issue because the color B exceeds the range of the NTSC system; however, in the color G and the color R, the chromaticity ranges of the colors G and R tend to be narrow, so an improvement in display is desired.

In recent years, to improve the color reproduction by expanding a color range or improving color balance, a technique of combining a CCFL tube and another light source has been proposed (refer to Japanese Unexamined Patent Application Publication Nos. 2004-139876, 200544756, 2004-294984 and 2004-163902).

SUMMARY OF THE INVENTION

In Japanese Unexamined Patent Application Publication Nos. 2004-139876 and 2005-44756, a backlight including a combination of a cold cathode fluorescent tube and a light emitting diode (LED) is proposed. The structures of backlights including a combination of two kinds of light sources are described in Japanese Unexamined Patent Application Publication Nos. 2004-139876 and 2005-44756; however, the spectrum ranges, the shapes or the peak positions of the light sources which are factors causing the expansion of the color gamut, or blocking which achieves the expansion of the color gamut is not described in detail, and the extent of color reproduction which can be obtained is not clarified.

In Japanese Unexamined Patent Application Publication No. 2004-294984, a backlight which includes a cold cathode fluorescent tube emitting the colors G and B selected out of the primary colors R, G and B and a LED emitting the color R is disclosed. In Japanese Unexamined Patent Application Publication No. 2004-294984, to expand the color gamut, a LED with a peak wavelength of 630 nm or over is combined instead of an R phosphor of a CCFL tube, thereby the peak wavelength of the light of the color R is shifted to a long wavelength side to obtain an effect of expanding the color gamut. However, in the light of the color G, the emission spectrum from the G phosphor of the CCFL tube contains a sub-spectrum corresponding to orange (with a peak wavelength of 580 nm), so the influence of the sub-spectrum remains, thereby it is difficult to achieve sufficient expansion of the color gamut. The NTSC ratio calculated based on the description of Japanese Unexamined Patent Application Publication No. 2004-294984 is approximately 81%, so there is still room for improvement.

In Japanese Unexamined Patent Application Publication No. 2004-163902, a technique of improving color reproduction by improving the characteristics of a color filter of a LCD panel according to light emission characteristics of a CCFL tube as a backlight is disclosed. According to the technique, an effect by the improvement in the color filter is large, and as the NTSC ratio calculated based on the description of Japanese Unexamined Patent Application Publication No. 2004-163902, a high value of 99.1% is obtained. However, in the technique, the pass-bandwidth of each color filter is narrowed to improve color purity, so a loss due to light shielding by the color filter is large, thereby as a result, the intensity is declined from 350 cd/m$^2$ to 235 cd/m$^2$ by approximately 27%. In Japanese Unexamined Patent Application Publication No. 2004-163902, a method of using a light source including a combination of a CCFL tube and a LED as a backlight is mentioned, but is not described in detail, so a structure capable of achieving the expansion of the color gamut is not clarified.

In view of the foregoing, it is desirable to provide a liquid crystal display and a light source apparatus which are capable of improving color reproduction compared to those in related arts without a decline in intensity.

According to an embodiment of the invention, there is provided a light source apparatus including: a cold cathode fluorescent tube including a B phosphor for blue and a G phosphor for green; and a light emitting diode for red, wherein the G phosphor emits a single-spectrum light with a peak wavelength of 510 to 530 nm, and the light emitting diode emits a single-spectrum light with a peak wavelength of 620 to 650 nm.

According to an embodiment of the invention, there is provided a liquid crystal display including: a light source apparatus: and a liquid crystal display device displaying an image through the use of light emitted from the light source apparatus as transillumination light, wherein the light source apparatus includes: a cold cathode fluorescent tube including a B phosphor for blue and a G phosphor for green; and a light emitting diode for red, and the G phosphor emits a single-spectrum light with a peak wavelength of 510 to 530 nm, and the light emitting diode emits a single-spectrum light with a peak wavelength of 620 to 650 nm.

In the light source apparatus and the liquid crystal display according to the embodiment of the invention, only the B phosphor and the G phosphor are applied to the cold cathode fluorescent tube, and instead of an R phosphor, the light emitting diode emitting a single spectrum which has a peak at 620 to 650 nm is used, so an influence of a sub-spectrum of 595 nm of the R phosphor which is an issue arising in cold cathode fluorescent tubes in related arts is eliminated.

In the above-described light source apparatus, in the case where a mercury gas is sealed in the cold cathode fluorescent tube as an excitation gas, as the G phosphor, a phosphor emitting a single-spectrum light with a peak wavelength of 510 to 520 nm is preferably used.

Moreover, in the case where an ultraviolet excitation gas not generating an emission line spectrum in a wavelength range of visible light is sealed in the cold cathode fluorescent tube as the excitation gas, as the G phosphor, a phosphor emitting a single-spectrum light with a peak wavelength of 510 to 530 nm can be used. As such an ultraviolet excitation gas, a xenon gas is preferable. In this case, as the G phosphor, a phosphor emitting a single-spectrum light with a peak wavelength of 520 to 530 nm can be used.

According to another embodiment of the invention, there is provided a light source apparatus as a backlight source of a liquid crystal display device, the liquid crystal display device including a blue filter, a green filter and a red filter for displaying a color image, the light source apparatus including: a cold cathode fluorescent tube including a B phosphor for blue and a G phosphor for green; and a light emitting device for red arranged at a color mixture distance from the cold cathode fluorescent tube; and a diffusing member diffusing color light emitted from the cold cathode fluorescent tube and color light emitted from the light emitting device, thereby uniforming an intensity distribution of white light as a resultant of color mixture of lights, wherein the peak wavelength of spectrum light of the light emitting device for red is located outside the transmission wavelength range of the green filter. In this case, "the peak wavelength of spectrum light of the light emitting device for red is located outside the transmission wavelength range of the green filter" means that the transmittance of the green filter in the peak wavelength is nearly zero.

According to another embodiment of the invention, there is provided a liquid crystal display including: a liquid crystal display device including a blue filter, a green filter and a red filter to display a color image; and a light source apparatus as a backlight source of the liquid crystal display device, wherein the light source apparatus includes: a cold cathode fluorescent tube including a B phosphor for blue and a G phosphor for green; a light emitting device for red arranged at a color mixture distance from the cold cathode fluorescent tube; and a diffusing member diffusing color light emitted from the cold cathode fluorescent tube and color light emitted from the light emitting device, thereby uniforming an intensity distribution of white light as a resultant of color mixture of lights, wherein the peak wavelength of spectrum light of the light emitting device for red is located outside the transmission wavelength range of the green filter.

In the light source apparatus and the liquid crystal display according to another embodiment of the invention, the light emitting device for red is arranged at a color mixture distance from the cold cathode fluorescent tube, so blue light and green light emitted from the cold cathode fluorescent tube and red light emitted from the light emitting device are sufficiently mixed to produce white light. The white light is diffused by the diffusing member so as to become white light with an uniformed intensity distribution. Moreover, the spectrum peak wavelength of red light emitted from the light emitting device for red is set so as to be located outside the transmission wavelength range of the green filter, so a part of red light can be prevented from passing through the green filter.

In the liquid crystal display and the light source apparatus according to the embodiment of the invention, only the B phosphor and the G phosphor are applied to the cold cathode fluorescent tube, and the light emitting diode emitting a single-spectrum light which has a peak at 620 to 650 nm is used instead of the R phosphor, so color reproduction can be improved more than that in related arts without declining intensity.

Moreover, in the liquid crystal display and the light source apparatus according to another embodiment of the invention, the spectrum peak wavelength of red light emitted from the light emitting device for red light is located outside the transmission wavelength range of the green filter, so red light is almost perfectly blocked by the green filter, thereby red can be prevented from being mixed into a green pixel. As a result, compared to related arts, the color reproduction can be improved. Moreover, blue light and green light emitted from the cold cathode fluorescent tube and red light emitted from the light emitting device are sufficiently mixed, and then diffused by the diffusing member, so white light with a uniform intensity distribution can be obtained, and a decline in color reproduction due to variations in intensity can be prevented.

Other and further objects, features and advantages of the invention will appear more fully from the following description.

BRIEF DESCRIPTION OF THE DRAWINGS

FIG. 2 is a table showing the structures of main parts of light source apparatuses of Comparative Examples 1 and 2 and Examples 1 through 3;

DETAILED DESCRIPTION OF THE PREFERRED EMBODIMENTS

A preferred embodiment will be described in detail below referring to the accompanying drawings.

Figure 14:
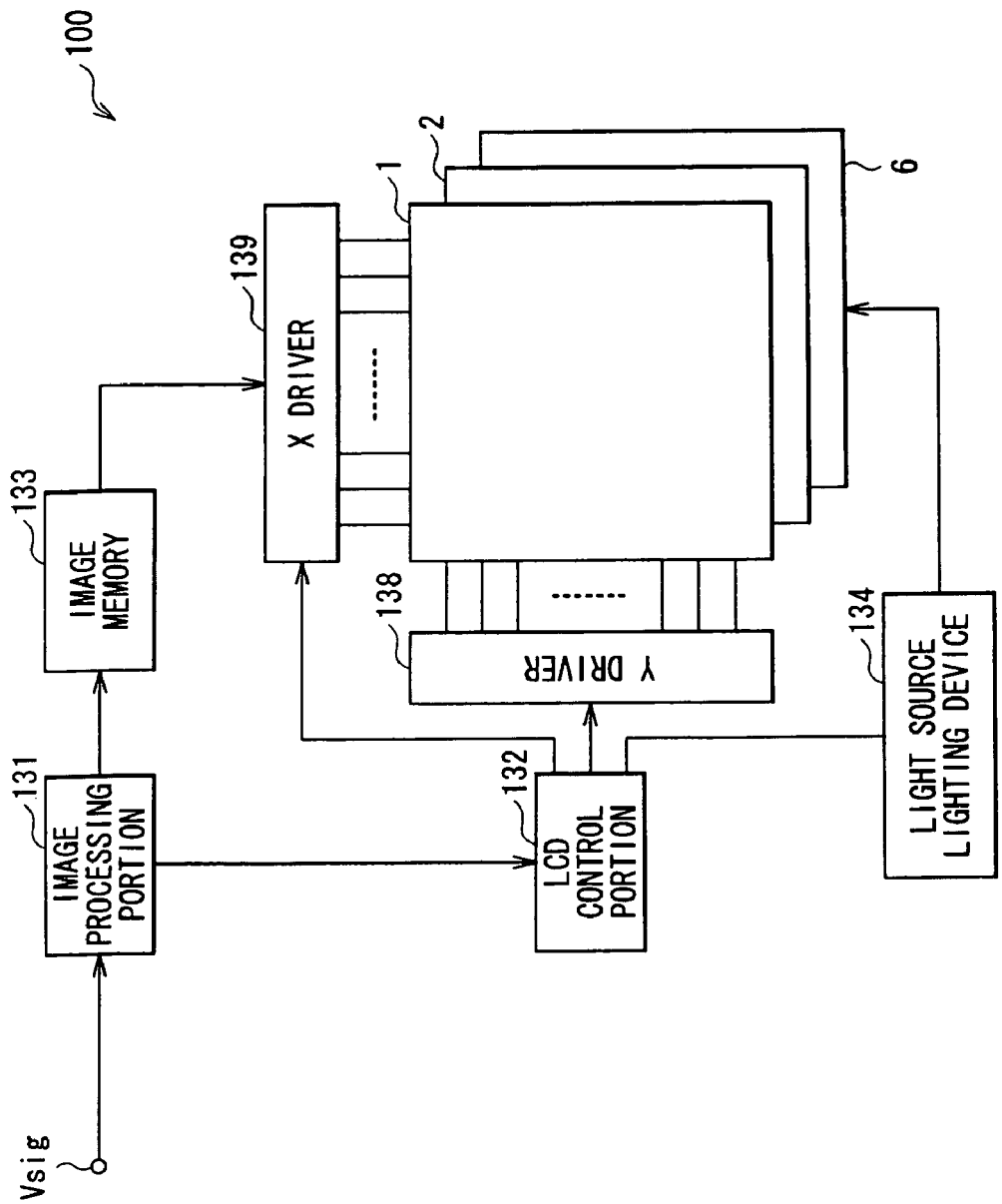
FIG. 14 is a block diagram of the whole structure of the liquid crystal display according to the embodiment of the invention.

FIG. 14 shows a block diagram of the whole liquid crystal display including a light source apparatus according to an embodiment of the invention. A liquid crystal display 100 includes a LCD panel 1, an optical part 2 and a light source apparatus 6, and further includes an image processing portion 131 which perform various signal processing, a LCD control portion 132 which controls the LCD panel 1 or the like, an image memory 133 which stores an image signal, a light source lighting device 134 which controls the lighting of the light source apparatus 6, and a Y driver 138 and an X driver 139 which both drive the LCD panel 1.

Figure 1:
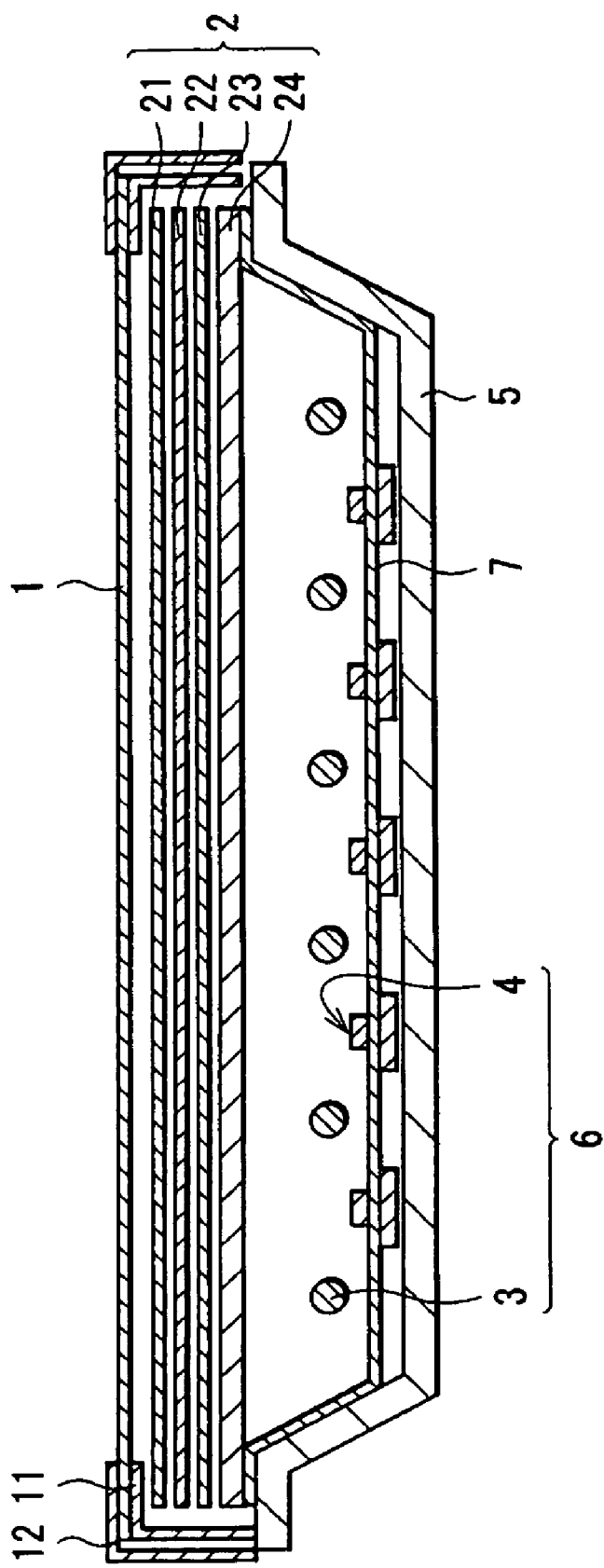
FIG. 1 is a sectional view of a main part of a liquid crystal display according to an embodiment of the invention.

FIG. 1 shows a sectional view of a main part of the liquid crystal display 100. The liquid crystal display 100 has a so-called direct-type backlight structure, and the optical part 2 is arranged directly below the LCD panel 1, and the light source apparatus 6 including a CCFL tube 3 and a LED 4 is arranged directly below the optical part 2. The light source apparatus 6 is supported by an enclosure 5.

The LCD panel 1 is a transmissive liquid crystal panel, and includes a common transparent electrode (not shown) and a plurality of pixel electrodes (not shown) arranged in a matrix form on the transparent electrode with a liquid crystal layer (not shown) in between. A color filter layer (not shown) corresponding to each of colors B, G and R is formed in each pixel electrode.

The optical part 2 is fixed through pressing a peripheral portion of the optical part 2 against a peripheral portion of the enclosure 5 by a supporting part 11 with a spacer (not shown) in between. The LCD panel 1 is fixed through pressing a peripheral portion of the LCD panel 1 against the supporting part 11 by a supporting part 12. A reflective sheet 7 is arranged on an inner surface of the enclosure 5, and a plurality of CCFL tubes 3 and a plurality of LEDs 4 are arranged on reflective sheet 7. As the reflective sheet 7 is arranged, light emitted from the CCFL tubes 3 to a back surface side (a side opposite to the LCD panel 1) can be also used.

The CCFL tubes 3 each have a straight pipe shape, and are arranged at equal intervals. The inner tube wall surfaces of the CCFL tubes 3 are coated with a B phosphor and a G phosphor, but not with an R phosphor. An excitation gas which emits ultraviolet radiation at the time of gas discharging is sealed in the CCFL tubes 3, and the generated ultraviolet radiation strike the B phosphor and the G phosphor to excite them, thereby to emit B-color light and G-color light. The emission spectrum characteristics of the CCFL tube 3 will be described in detail later.

Figure 3:
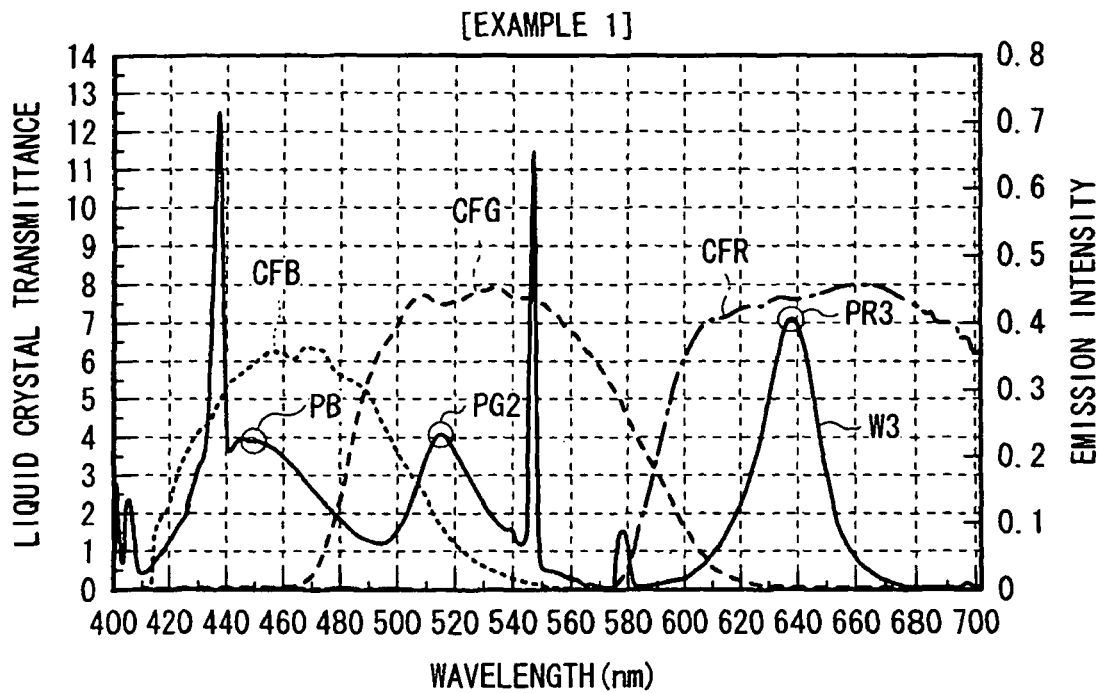
FIG. 3 is a plot showing the spectrum of the light source apparatus of Example 1 and color filter characteristics of a LCD panel.
Figure 4:
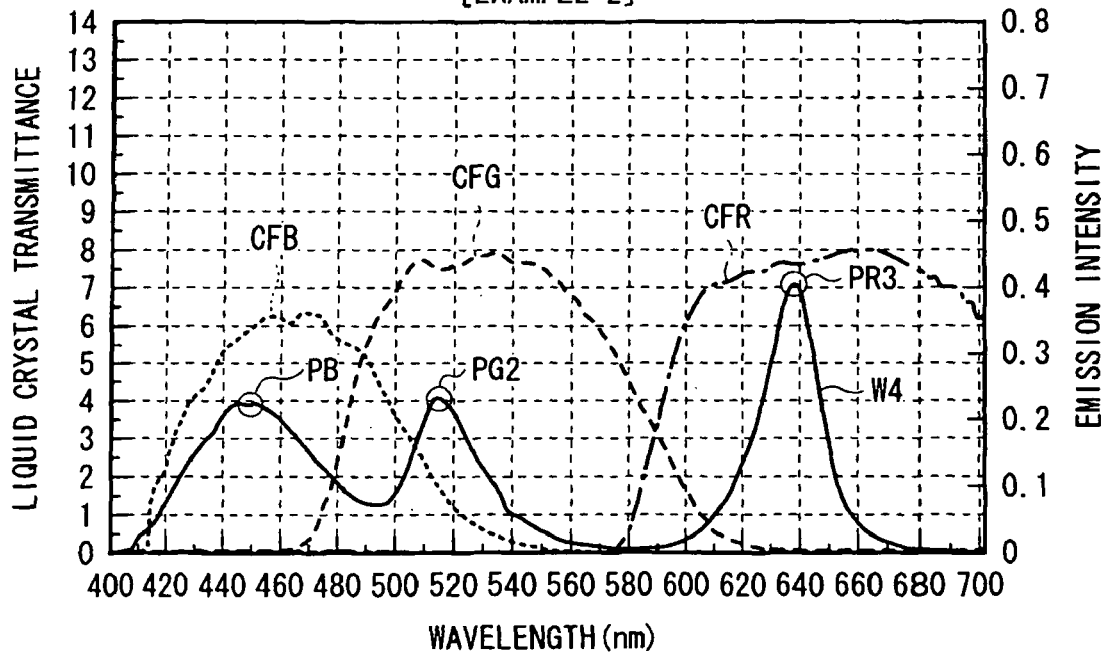
FIG. 4 is a plot showing the spectrum of the light source apparatus of Example 2 and color filter characteristics of a LCD panel.
Figure 5:
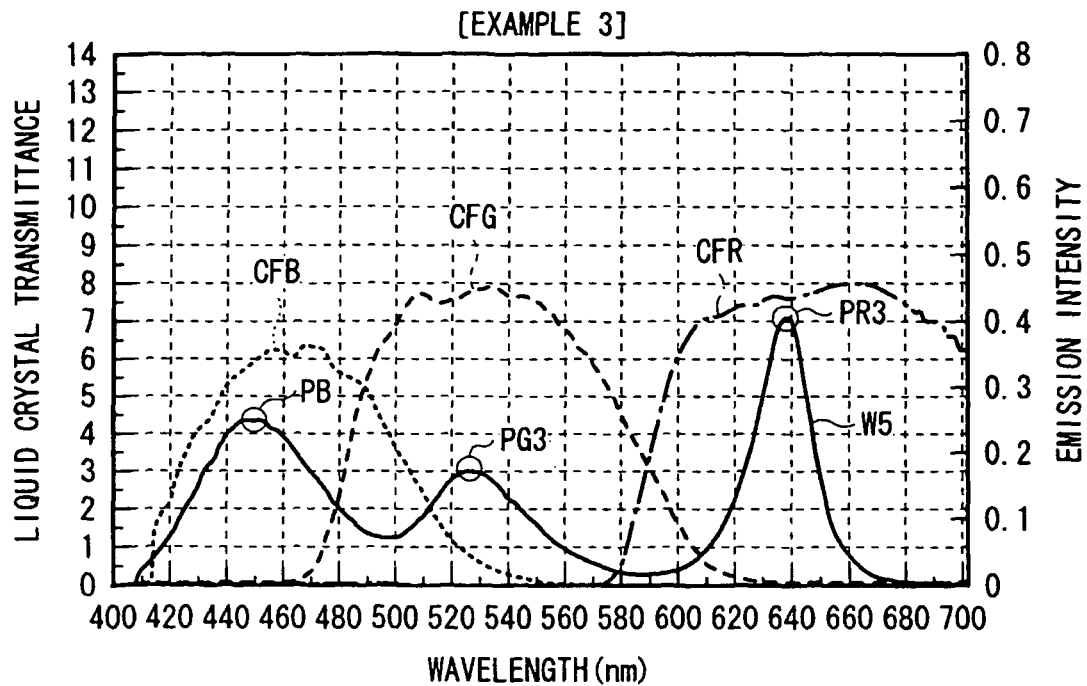
FIG. 5 is a plot showing the spectrum of the light source apparatus of Example 3 and color filter characteristics of a LCD panel.

In general, the LEDs 4 are used instead of an R phosphor which is applied to the inner tube wall surfaces of the CCFL tubes 3 to emit R-color light, and the LEDs 4 emit R-color light with a single spectrum. As shown in FIGS. 3 through 5, the wavelength of an emission spectrum peak PR3 of each LED 4 is located outside a transmission wavelength range CFG of a green filter in the above-described color filter layer of CLD panel 1. In other words, the transmittance of the green filter in the wavelength position of the peak PR3 is nearly zero. Therefore, red light can be prevented from passing through the green filter. The description about this will be given later.

The optical part 2 includes a polarizing/reflecting sheet 21, a prism sheet 22, a diffusion sheet 23 and a diffusion plate 24 in order from the LCD panel 1. The diffusion sheet 23 and the diffusion plate 24 are arranged at a sufficient diffusion distance from the light source apparatus 6, and diffuse light from the light source apparatus 6 so as to uniform an intensity distribution. Thereby, linear intensity variations due to the CCFL tubes 3 as line light sources can be prevented. The prism sheet 22 has a function of adjusting the directivity of diffused incident light so as to improve the intensity of the front surface of the LCD panel 1. The polarizing/reflecting sheet 21 multiply reflects an s-polarized wave of an incident light wave to convert the reflected s-polarized wave into a p-polarized wave which matches the transmission axis of the LCD panel 1, thereby to use the incident light without waste. The thickness of the whole backlight structure is adjusted according to the pitch between the CCFL tubes 3 and the diffusion distance to bring variations in intensity and thickness into balance.

A plurality of the LEDs 4 are arranged between the CCFL tubes 3 at equal intervals at a distance enabling color mixture of lights from the CCFL tubes 3, thereby light variations in the LEDs 4 as point light sources can be prevented. A portion of each LED 4 except for a light-emitting portion is covered with the reflective sheet 7 so as not to prevent back diffusion from the CCFL tubes 3. As thermal design, to maintain the operation temperature of the CCFL tubes 3 at 65 to 80 degrees and the operation temperature of the LEDs 4 at 65 degrees or less, the enclosure 5 is made of a metal (for example, an AL alloy) to secure heat radiation characteristics. The CCFL tubes 3 are arranged on the enclosure 5 as a radiator plate with air and the reflective sheet 7 in between, so the CCFL tubes 3 has large thermal resistance. On the other hand, the LEDs 4 are directly arranged on the enclosure 5, so the LEDs 4 has small thermal resistance. When the LEDs 4 are of the direct type, compared to the case where a light guide plate which will be described later is used, the brightness is more easily adjusted by increasing the number of LEDs 4. Moreover, as the light guide plate is not used, the direct type is suitable for. large high-intensity TVs.

Next, the operation of the liquid crystal display with the above structure will be described below.

As shown in FIG. 14, an image signal Vsig generated by reception or reproduction is inputted into the image processing portion 131. The image processing portion 131 achieves separation between an image data signal and a sync signal to transmit an X-direction (horizontal scanning direction) image data signal of each scanning line to the image memory 133, and to send a sync signal to the LCD control portion 132. The LCD control portion 132 sends a control signal for controlling the Y driver 138 and the X driver 139 and a control signal for controlling the light source lighting device 134.

The light source lighting device 134 controls the lighting operation of the light source apparatus 6 by the control signal from the LCD control portion 132. The optical part 2 performs an optical process which will be described later on light emitted from the light source apparatus 6 to project the light on the back surface of the LCD panel 1. In the LCD panel 1, the Y driver 138 selects horizontal scanning lines which display an image on a line-by-line basis, and the X driver 139 controls the amount of transmitted light according to a value stored in the image memory 133. Thereby, in the LCD panel 1, an image according to the image signal Vsig is displayed in a position according to the sync signal included in the image signal Vsig.

As shown in FIG. 1, while B-color light and G-color light emitted from the CCFL tubes 3 and R-color light emitted from the LEDs 4 go the color mixture distance, they are mixed to enter the optical part 2 as white light. While the white light passes through the optical part 2, the white light is subjected to the actions of uniforming the intensity distribution, providing front directionality, making an sp polarization conversion or the like, and then the white light enters the LCD panel 1. The LCD panel 1 performs transmission intensity modulation on each pixel according to an image signal inputted from an image processing circuit (not shown). At this time, color filters for B, G and R (not shown) of the LCD panel 1 selectively allow a B-color wavelength range, a G-color wavelength range and an R-color wavelength range in the white light entering from the optical part 2 to pass therethrough. Thereby, a color image is displayed.

Next, the emission spectrum characteristics of the CCFL tubes 3 and the LEDs 4 in the light source apparatus 6 will be described below together with the spectral transmission characteristics of the color filters of the LCD panel 1. Comparative Examples 1 and 2 will be described before describing Examples 1 through 3 according to the embodiment.

FIG. 2 shows a table of the structure of main parts of light source apparatuses of Comparative Examples 1 and 2 and Examples 1 through 3. FIG. 2 shows kinds of light sources (phosphor or LED) for B-color light, G-color light and R-color light and the spectrum peak wavelengths of B-color light, G-color light and R-color light. Moreover, in the examples, used excitation gases and obtained NTSC ratios are shown.

COMPARATIVE EXAMPLE 1

Figure 8:
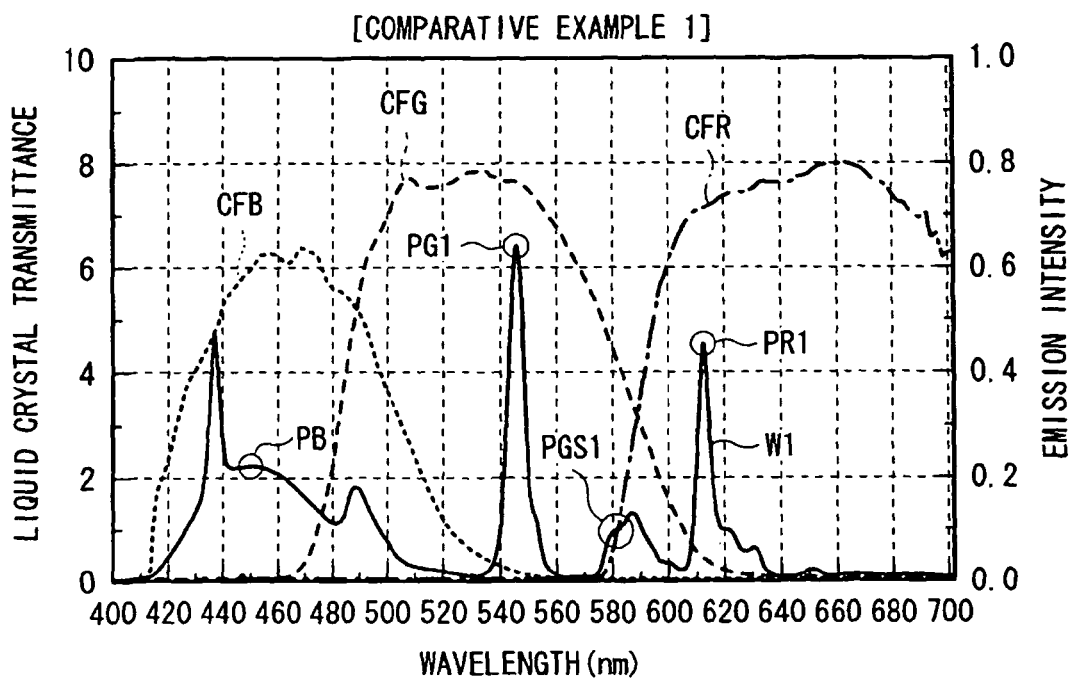
FIG. 8 is a plot showing the spectrum of the light source apparatus of Comparative Example 1 and color filter characteristics of a LCD panel.

FIG. 8 shows the spectrum of the light source apparatus of Comparative Example 1 and color filter characteristics of the LCD panel. In the plot, the horizontal axis indicates wavelength (nm), and a vertical axis indicates emission intensity of the emission spectrum of the light source (right vertical axis) and the transmittances of the color filters of the LCD panel (left vertical axis). The unit of the vertical axis is an arbitrary unit.

In the example, as shown in FIG. 2, as the light source apparatus, only a CCFL tube using a B phosphor, a G phosphor and an R phosphor is used, and as an excitation gas, mercury (Hg) is used. As the B phosphor, a $BaMgAl_{10}O_{17}$-based phosphor (LP-B4 of Kasei Optonix, Ltd.) is used, and as the G phosphor, $LaPO_4$:Ce, Tb (LP-G2 of Kasei Optonix, Ltd.) is used. As the R phosphor, $Y_2O_3$:Eu (LP-RE1 of Kasei Optonix, Ltd.) is used. In FIG. 8, W1 indicates the emission spectrum of the whole CCFL tube, and CFB, CFG and CFR indicate the spectral transmission spectrums of color filters for B, G and R of the LCD panel, respectively.

In the emission spectrum W1 of the CCFL tube, a peak PB of 450 nm is the peak of the B phosphor, and a peak PG1 of 545 nm is the peak of the G phosphor. A peak PR1 of 613 nm is the peak of the R phosphor. As the excitation gas, Hg is used, so emission line spectrums are included in visible light around 404 nm, 436 nm, 546 nm and 578 nm. Among these emission line spectrums of Hg, an emission line spectrum of 546 nm matches the peak PG1 of the G phosphor.

Figure 10:
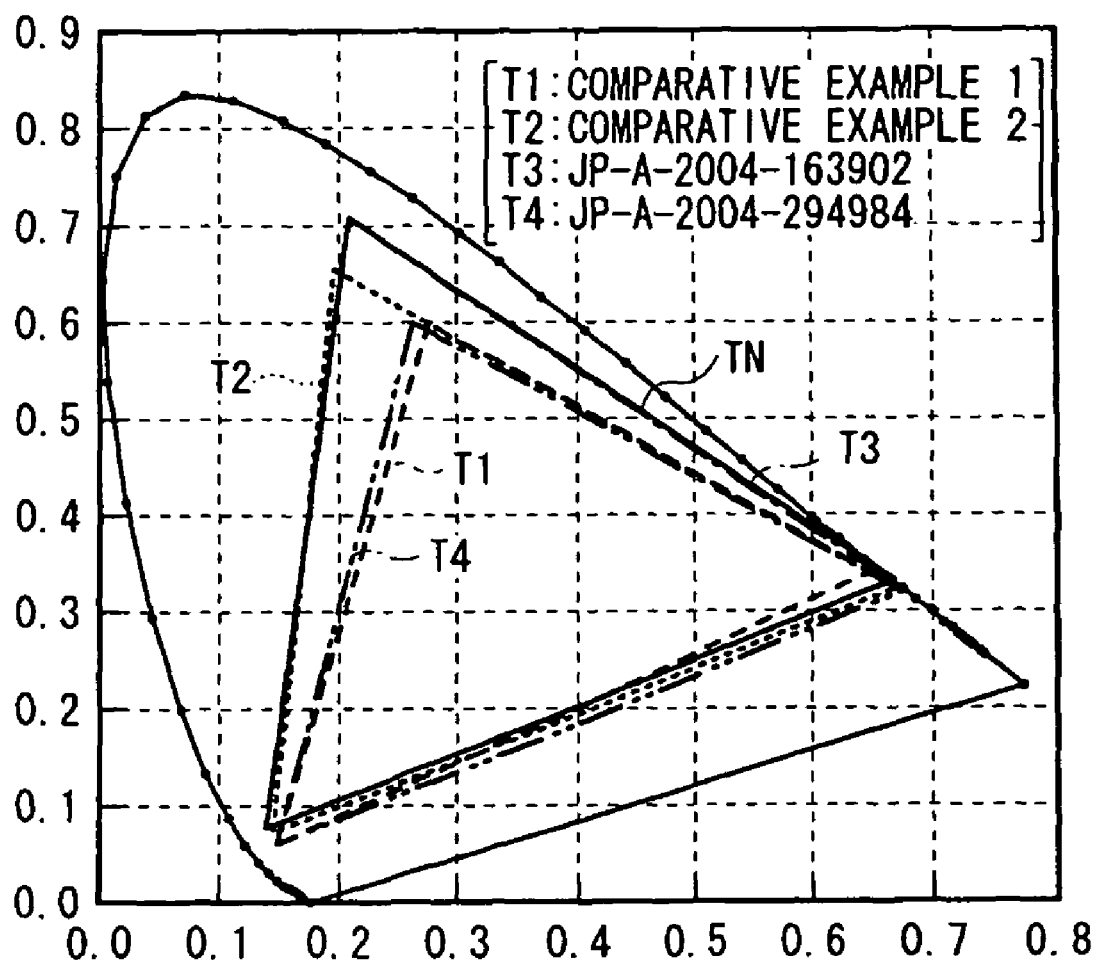
FIG. 10 is a chromaticity diagram showing color gamuts of the light source apparatuses of Comparative Examples 1 and 2.

The color gamut in the case where the CCFL tube is used as a backlight is shown by T1 (by a long dashed line) in a chromaticity diagram shown in FIG. 10. In FIG. 10, the horizontal axis indicates x chromaticity, and the vertical axis indicates y chromaticity. TN indicates the NTSC color gamut.

In the example, the NTSC ratio is as low as 74.9% (refer to FIG. 2), and the color gamut is narrow. The color B exceeds the NTSC color gamut, so the color B has no issue; however, in the color G and the color R, the chromaticity is narrow, so an improvement is desired as a display.

The cause of the narrow color gamut in Comparative Example 1 is considered as follows.

A factor determining the xy chromaticity points of R, G and B which determine the color gamut is, in the case of the LCD panel, to what extent the spectrum of the backlight interferes in each color wavelength range of the spectral transmittance of the color filters of the LCD panel. In the example shown in FIG. 8, in light from the G phosphor of the CCFL tube, in addition to a main spectrum PG1 of 545 nm, a sub-spectrum PGS1 is observed at around 580 nm. Therefore, an orange-tinted color which is a mixture of 545-nm emission and 580 nm emission from the G phosphor is included in the wavelength range of the G-color filter of the LCD panel, thereby the color gamut of the color G is reduced. The sub-spectrum PGS1 of around 580 nm from the G phosphor is also included in the wavelength range of the R-color filter of the LCD panel, so the sub-spectrum PGS1 is mixed with the main spectrum PR1 of 613 nm from the R phosphor, thereby as a result, the color gamut of the color R is also reduced.

Figure 11:
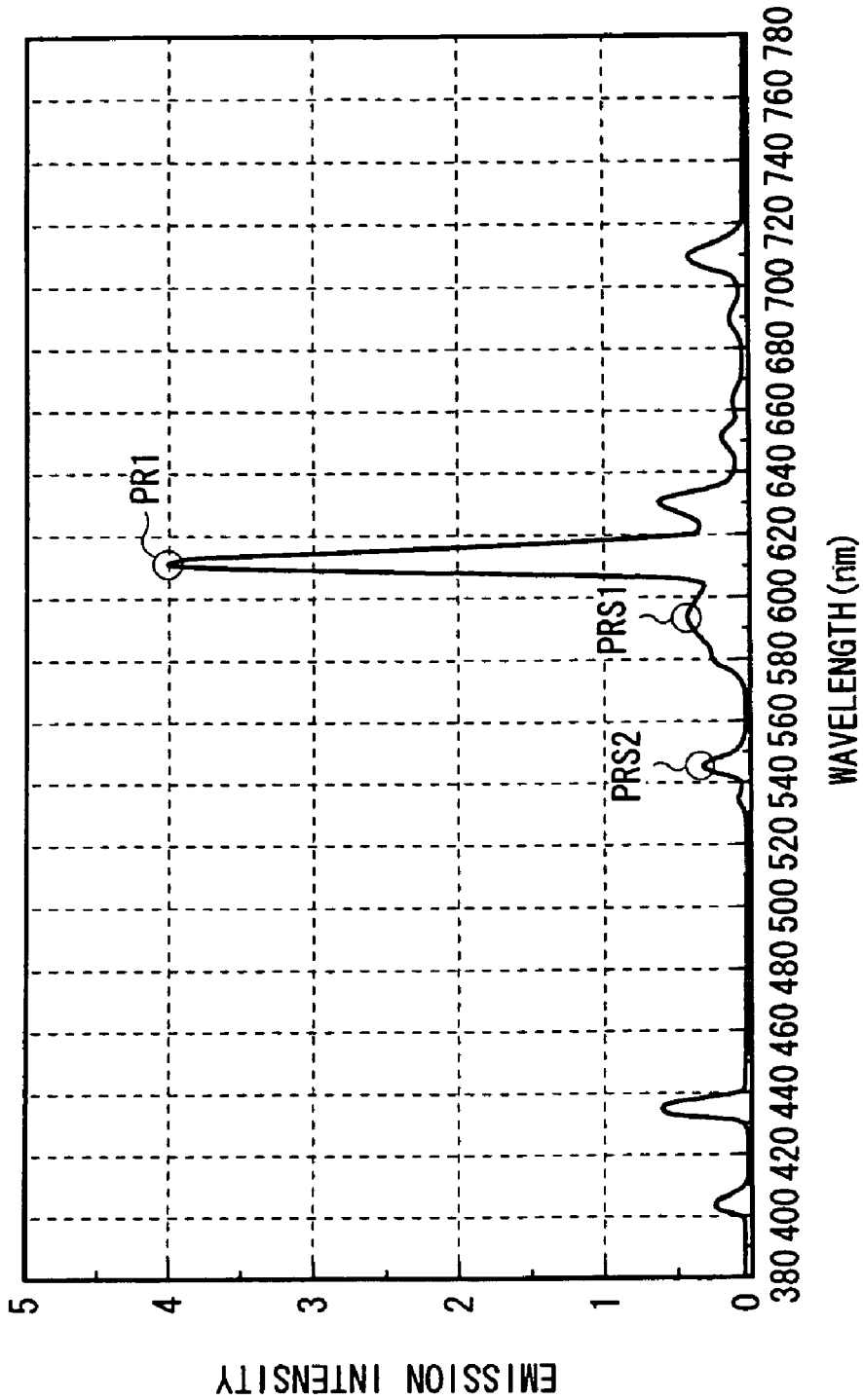
FIG. 11 is a plot showing the emission spectrum of an R-color phosphor used in a CCFL tube of Comparative Example 1.

Moreover, the narrow color gamut in Comparative Example 1 is also caused by the emission spectrum from the R phosphor of the CCFL tube. FIG. 11 is a plot showing the emission spectrum of the R phosphor used in the CCFL tube of Comparative Example 1. As shown in the plot, in addition to a main spectrum PR1 of 613 nm, sub-spectrums PRS1 and PRS2 are observed at around 590 nm and 545 nm, respectively, and the sub-spectrums PRS1 and PRS2 are included in the band of the color filter for the color R, so they cause a reduction in the color gamut of G-color light.

COMPARATIVE EXAMPLE 2

Figure 9:
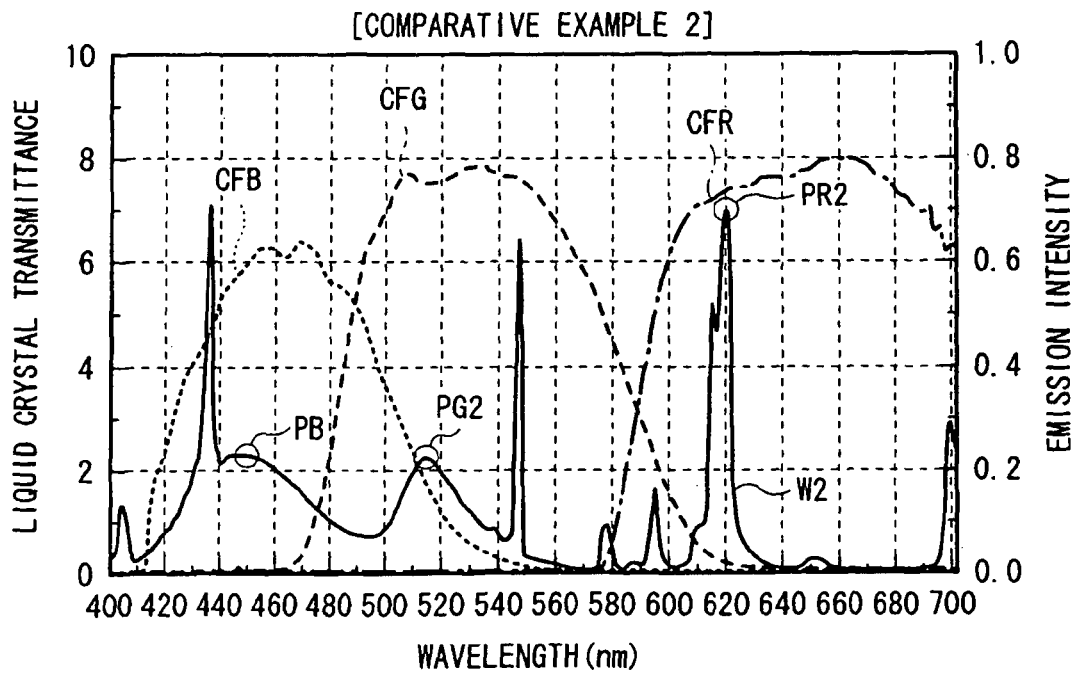
FIG. 9 is a plot showing the spectrum of the light source apparatus of Comparative Example 2 and color filter characteristics of a LCD panel.

FIG. 9 shows the spectrum of the light source apparatus of Comparative Example 2 and the color filter characteristics of the LCD panel. The meanings of the horizontal axis and the vertical axis are the same as those in FIG. 8.

In the example, as shown in FIG. 2, as in the case of Comparative Example 1, as the light source apparatus, a CCFL tube using a B phosphor, a G phosphor and an R phosphor is only used, and mercury is used as the excitation gas. However, unlike Comparative Example 1, as the G phosphor, $BaMgAl_{10}O_{17}$-based phosphor (LP-G3 of Kasei Optonix, Ltd.) is used, and as the R phosphor, $YV_4O_3$:Eu (MGV-620 of Kasei Optonix, Ltd.) is used. The same phosphor as that in Comparative Example 1 is used as the B phosphor. In FIG. 9, W2 indicates the emission spectrum of the whole CCFL tube. The meanings of CFB, CFG and CFR are the same as those in Comparative Example 1 (refer to FIG. 8).

In the emission spectrum W2 of the CCFL tube, a peak PB of 450 nm is the peak of the B phosphor, and a peak PG2 of 514 nm is the peak of the G phosphor. A peak PR2 of 620 nm is the peak of the R phosphor. As Hg is used as the excitation gas, emission line spectrums are included in visible light around 404 nm, 436 nm, 546 nm and 578 nm.

Figure 12:
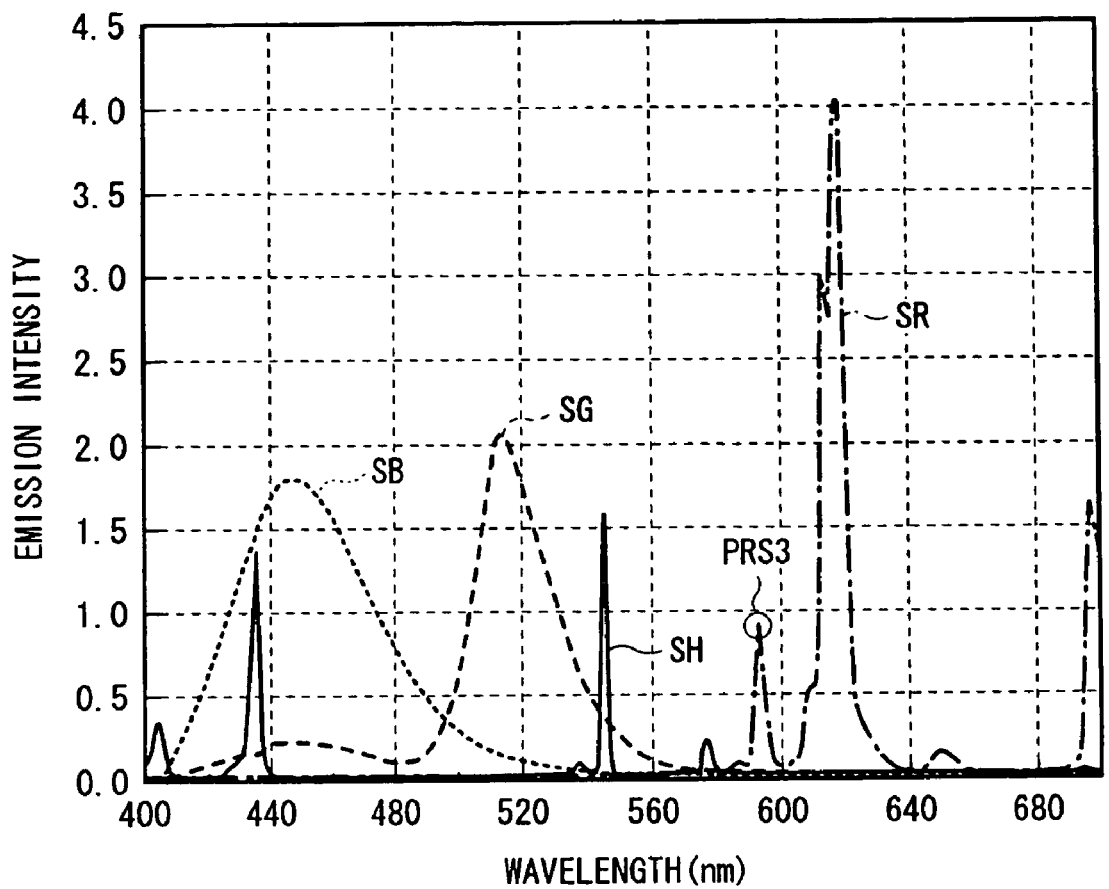
FIG. 12 is a plot showing the emission spectrum of each color phosphor used in a CCFL tube of Comparative Example 2 and the emission spectrum of mercury.

The color gamut in the case where the CCFL tube is used as a backlight is shown by T2 (by a short dashed line) in the chromaticity diagram shown in FIG. 10. In the example, the NTSC ratio is 92.8% (refer to FIG. 2), and the color gamut is much improved, compared to Comparative Example 1. It can be considered that as the G phosphor emitting light having a single peak PG2 at around 514 nm is used, the influence of the sub-spectrum of around 580 nm from the G phosphor of the CCFL tube in Comparative Example 1 is reduced, and the color gamut of the color G is improved. Moreover, it can be considered that the color gamut of the color R is improved through shifting the peak PR1 from around 614 nm in Comparative Example 1 to 620 nm (PR2). However, as shown in FIG. 12, the emission spectrum from the R phosphor includes a sub-spectrum PRS3 of 595 nm, so a factor which causes a reduction in the color gamut still remains. FIG. 12 shows the emission spectrum of each color phosphor used in the CCFL tube of Comparative Example 2 and the emission line spectrum of mercury. In FIG. 12, SB, SG and SR indicate emission spectrums of the B phosphor, the G phosphor and the R phosphor, respectively, and SH indicates the emission line spectrum of mercury.

In the chromaticity diagram shown in FIG. 10, T3 (a dashed-dotted line) indicates the color gamut of a liquid crystal display in Japanese Unexamined Patent Application Publication No. 2004-163902, and T4 (a dashed-two dotted line) indicates the color gamut of a liquid crystal display in Japanese Unexamined Patent Application Publication No. 2004-294984.

In consideration of Comparative Examples 1 and 2, Examples 1 through 3 are formed.

EXAMPLE 1

FIG. 3 shows the spectrum of the light source apparatus of Example 1 and the color filter characteristics of the LCD panel. The meanings of the horizontal axis and the vertical axis are the same as those in FIG. 8.

In the example, as the light source apparatus, a combination of the CCFL tube 3 to which the B phosphor and the G phosphor are applied and the LED 4 is used, and as the excitation gas, mercury is used. The B phosphor and the G phosphor of the CCFL tube 3 are the same as those in Comparative Example 2, and the LED 4 is a AlInGaP-based red light emitting diode (refer to FIG. 2). In FIG. 3, W3 indicates the emission spectrum of the combination of the CCFL tube and the LED. The meanings of CFB, CFG and CFR are the same as those in Comparative Example 1 (refer to FIG. 8).

In the emission spectrum W3, a peak PB of 450 nm is the peak of the B phosphor of the CCFL tube 3. A peak PG2 of around 510 to 520 nm (around 514 nm in FIG. 3) is a single spectrum with a half-width of 30 nm or less, and is the peak of the G phosphor of the CCFL tube 3. A peak PR3 of 620 to 650 nm (around 638 nm in FIG. 3) is a single spectrum with a half width of 25 nm or less, and is the peak of the LED 4. As Hg is used as the excitation gas, emission line spectrums are included in visible light around 404 nm, 436 nm, 546 nm and 578 nm.

In Example 1, as a first light source, the CCFL tube is used; however, the R phosphor is not used, so a spectrum longer than 585 nm is removed. Moreover, as the G phosphor which emits an emission spectrum. having a peak at 510 to 520 nm is used, an issue caused by the sub-spectrum PGS 1 of 580 nm in Comparative Example 1 (refer to FIG. 8) is reduced. On the other hand, as a second light source, the LED 4 in which the wavelength of the peak (PR3) has a single spectrum of 620 to 650 nm is used, so the influence of the sub-spectrum PRS3 of 595 nm from the R phosphor which causes an issue in Comparative Example 2 (refer to FIG. 9) is eliminated. Moreover, the wavelength of the emission spectrum peak PR3 of the LED is located outside the transmission wavelength range CFG of the green filter of the LCD panel 1, so a part of red light can be prevented from passing through the green filter, thereby red can be prevented from being mixed into a green pixel, so color reproduction can be improved.

Figure 6:
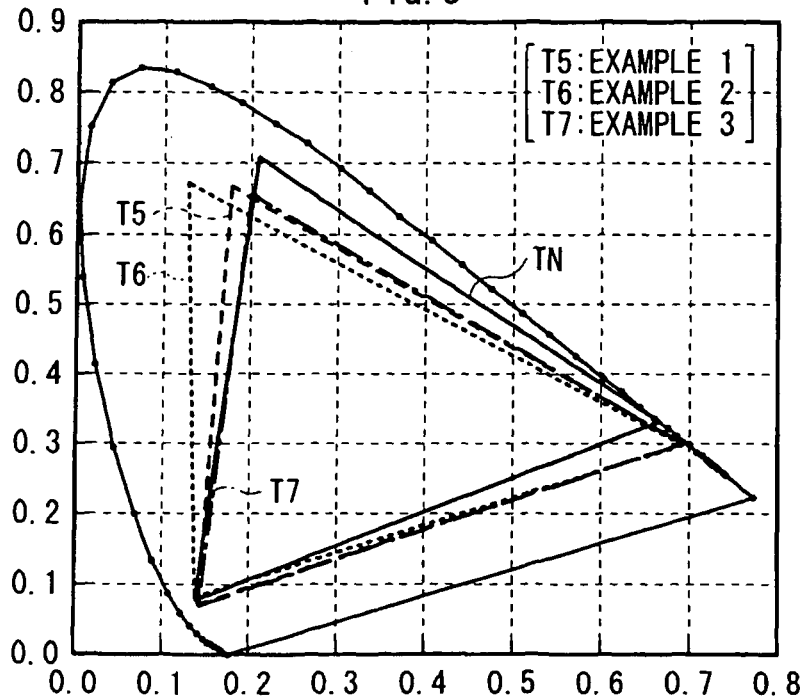
FIG. 6 is a chromaticity diagram showing the color gamuts of the light source apparatuses of Examples 1 through 3.

The color gamut in the case where such a light source is used as the backlight is as shown by T5 (a long dashed line) in the chromaticity diagram in FIG. 6. In the example, the color gamuts of the colors G and R expand so as to achieve a NTSC ratio of 101.3% (refer to FIG. 2), so compared to Comparative Examples 1 and 2, the color gamut is remarkably improved. In addition, TN in FIG. 6 indicates the NTSC color gamut.

EXAMPLE 2

FIG. 4 shows the spectrum of the light source apparatus of Example 2 and the color filter characteristics of the LCD panel. The meanings of the horizontal axis and the vertical axis is the same as those in FIG. 8.

In the example, as the light source, a combination of the CCFL tube 3 to which the B phosphor and the G phosphor are applied and the LED 4 is used, and as the excitation gas, xenon (Xe) which is a noble gas is used (refer to FIG. 2). Other structures are the same as those in Example 1. In FIG. 4, W4 indicates the emission spectrum of the combination of the CCFL tube 3 and the LED 4. The meanings of CFB, CFG and CFR are the same as those in Comparative Example 1 (refer to FIG. 8).

In the example, as xenon which is a noble gas is used as the excitation gas instead of mercury, the emission line spectrums of around 404 nm, 436 nm, 546 nm and 578 nm which are unique to mercury disappear. The color gamut in the case where the light source is used as a backlight is shown by T6 (a short dashed line) in the chromaticity diagram in FIG. 6. In the example, as the emission line spectrum of 546 nm of mercury does not exist, the peak PG2 of 510 to 520 nm of the G phosphor is a single spectrum, and the color gamut of the color G further expands to achieve an NTSC ratio of 104.5% (refer to FIG. 2). Moreover, in the example, the wavelength of the emission spectrum peak PR3 of the LED is located outside the transmission wavelength range CFG of the green filter of the LCD panel 1, so red can be prevented from being mixed into a green pixel, and color reproduction is improved.

EXAMPLE 3

FIG. 5 shows the spectrum of the light source apparatus of Example 3 and the color filter characteristics of the LCD panel. The meanings of the horizontal axis and the vertical axis are the same as those in FIG. 8.

Figure 7:
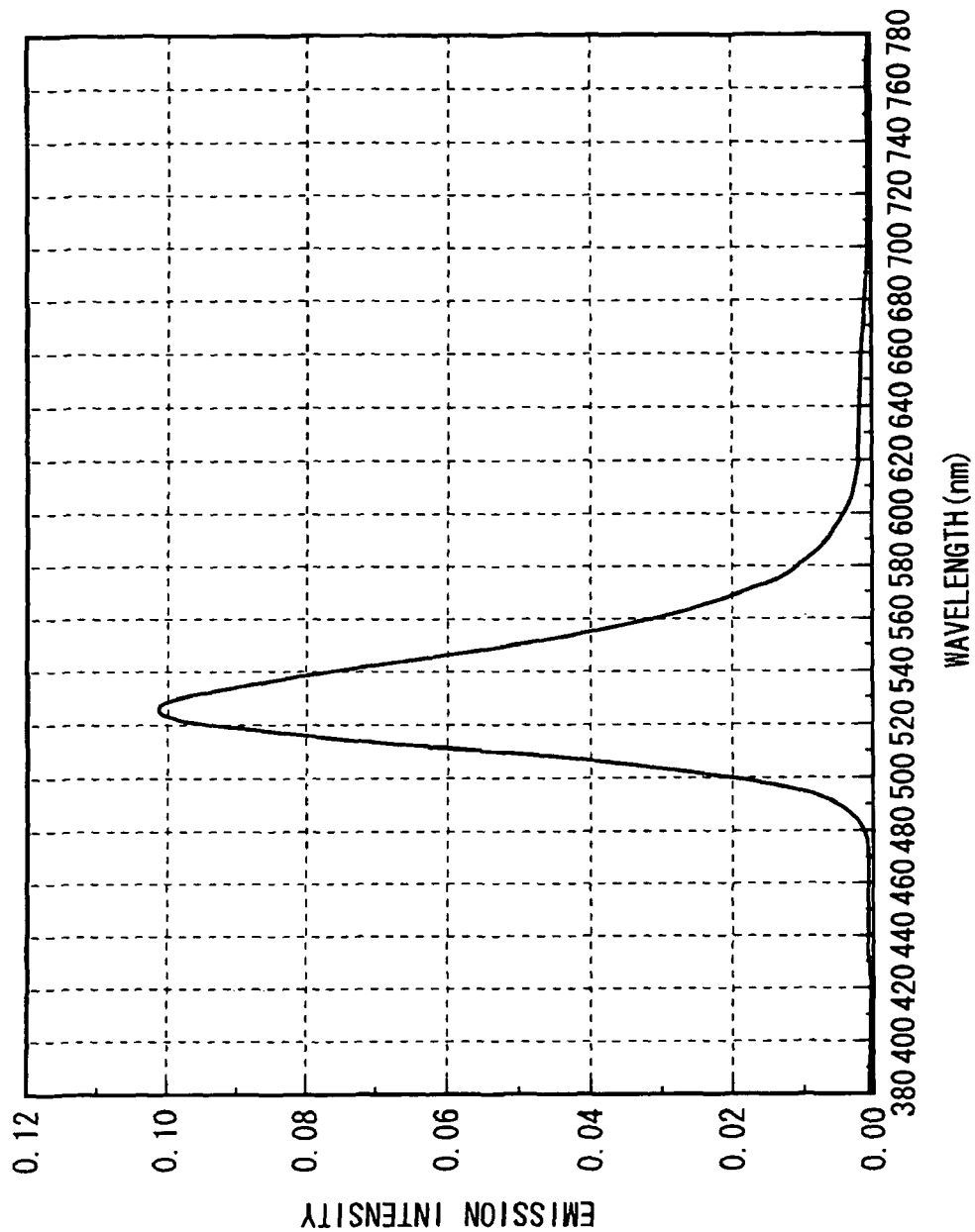
FIG. 7 is a plot showing the emission spectrum of a G-color phosphor used in a CCFL tube of Example 3.

In the example, as in the case of Example 2, as the light source, a combination of the CCFL tube 3 to which the B phosphor and the G phosphor are applied and the LED 4 is used, and as the excitation gas, xenon, which is a noble gas is used (refer to FIG. 2). However, unlike Example 2, as the G phosphor, a G phosphor $Zn_2SiO_4$:Mn (P1G of Kasei Optonix, Ltd.) used in a PDP (plasma display panel) is used. As shown in FIG. 7, the emission spectrum from the G phosphor has a single spectrum with a peak wavelength of 520 to 530 nm and a half width of 45 nm or less. Other structures are the same as those in Example 2. In addition, in FIG. 5, W5 indicates the emission spectrum of the combination of the CCFL tube 3 and the LED 4. The meanings of CFB, CFG and CFR are the same as those in Comparative Example 1 (refer to FIG. 8).

The color gamut in the case where the light source is used as a backlight is as shown by T7 (a dashed-dotted line). In Example 2, as a noble gas except for mercury is used as the excitation gas, so the color gamut expands; however, the peak wavelength of the emission spectrum of the G phosphor is 510 to 520 nm, which is too close to a short wavelength side, so an issue that the peak wavelength is shifted to the left from the G-color gamut in the NTSC color gamut arises. On the other hand, in Example 3, the peak PG3 of the single spectrum of the G phosphor is 520 to 530 nm, and is shifted to a long wavelength side, so a shift of the G-color gamut to the left (color phase shift) on the chromaticity diagram is prevented. However, the half width of the single spectrum of the G phosphor is slightly wider than that in Example 2, so the G-color gamut is slightly narrower, so the NTSC ratio is 98%. However, 98% is nearly equal to the NTSC color gamut, so the color reproduction is sufficient. Moreover, in the example, the wavelength of the emission spectrum peak PR3 of the LED is located outside the transmission wavelength range CFG of the green filter of the LCD panel 1, so red can be prevented from being mixed into a green pixel, and the color productivity is improved.

Thus, in the embodiment, a combination of the CCFL tube 3 to which the B phosphor and the G phosphor are applied and the R phosphor is not applied and the LED 4 is used as the light source apparatus, so an influence of the sub-spectrum of 595 nm of the R phosphor which is an issue arising in the CCFL tube of Comparative Example 2 is eliminated, thereby the color gamut can be expanded. More specifically, in Examples 1 and 2, the G phosphor which emits an emission spectrum having a peak at 510 to 520 nm is used, so an adverse influence due to the sub-spectrum of 580 nm which is an issue arising in Comparative Example 1 can be reduced, and the G phosphor has an effect on the expansion of the color gamut. Specifically in Example 2, a noble gas such as xenon instead of mercury is used as the excitation gas, so the emission line spectrum unique to mercury is eliminated, thereby the peak of 510 to 520 nm of the G phosphor is a single spectrum, so the color gamut of the color G further expands. Moreover, in Example 3, the peak of the single spectrum of the G phosphor is shifted to a longer wavelength side than that in Examples 1 and 2, so a shift of the G-color gamut to the left (color phase shift) on the chromaticity diagram is prevented, so superior color reproduction can be achieved. Further, the peak wavelength of the red light (the single spectrum) from the LED 4 is located outside the transmission wavelength range of the green filter of the LCD panel 1, so red is prevented from being mixed into a green pixel, thereby the color gamut expands (the color reproduction is improved).

In the embodiment, the LEDs 4 are directly arranged between the CCFL tubes 3, and the light guide plate is not used, so in particular, the LEDs 4 are suitable for large high-intensity TVs. Moreover, the LEDs 4 are arranged at a distance enabling color mixture of lights from the CCFL tube 3, and a diffusion part such as the diffusion plate 24 is arranged in a latter stage, so blue light and green light from the CCFL tube 3 and red light from the LED 4 are sufficiently mixed, and then they can be diffused. Therefore, white light with a uniform intensity distribution can be obtained, and a decline in color reproduction due to variations in intensity can be prevented.

Moreover, in the embodiment, the color G and B are generated through the use of the CCFL tube with a higher light emission efficiency than that of a backlight including only the LED, and the R-color LED with a high light emission efficiency among LEDs is used to generate the color R, so power consumption can be smaller than the backlight including only the LED.

Figure 13:
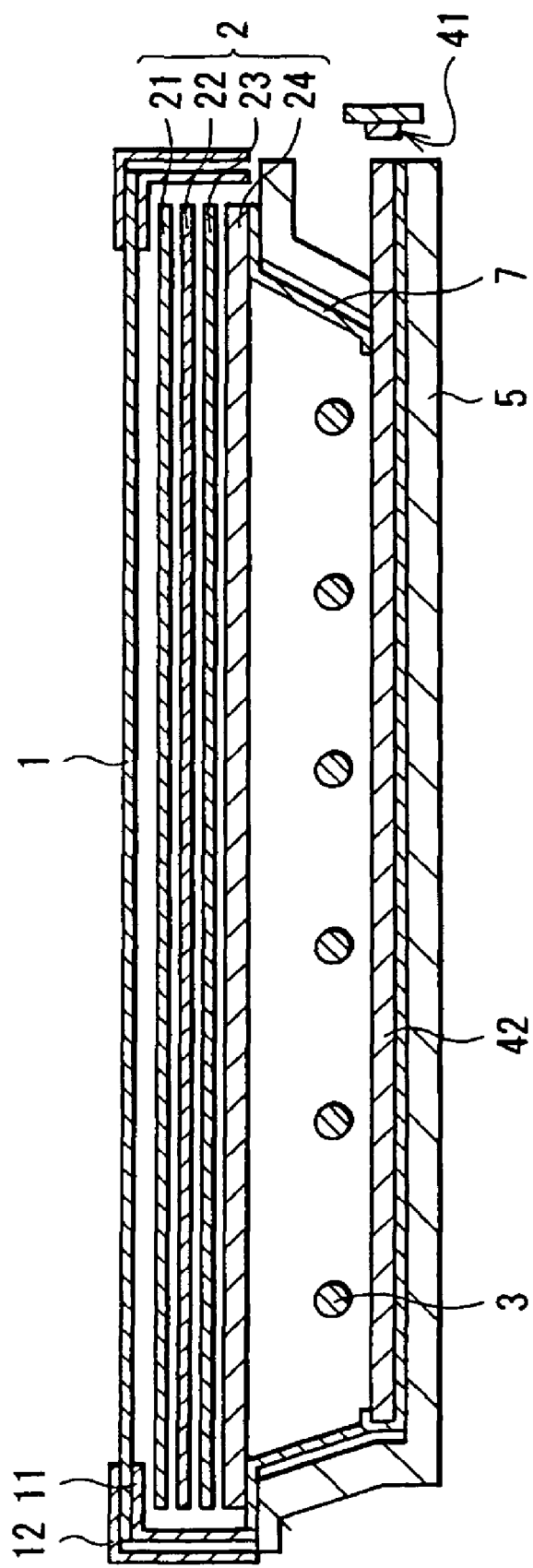
FIG. 13 is a sectional view of a main part of a liquid crystal display according to a modification.

Although the invention is described referring to the embodiment, the invention is not limited to the embodiment, and can be variously modified. For example, instead of the direct type in which the LEDs are directly arranged between the CCFL tubes shown in FIG. 1, as shown in FIG. 13, a plurality of LEDs 4 may be arranged along a side end surface of a light guide plate 42 arranged on the back sides of the CCFL tubes 3. A surface light source is formed through the use of the light guide plate 42, so it is not necessary to strictly consider the distance which enables color mixture of lights from the LEDs 4 and the lights from CCFL tubes 3, thereby as a result, the thickness of the backlight can be easily reduced. In the light guide plate type, a LED light source is arranged in a light guide plate edge, so the brightness is limited; however, only the color R among the colors R, G and B passes through the light guide plate, so the brightness is just ⅓ of the brightness of white light produced by mixing the colors R, G and B. Therefore, in the case where the light guide plate type is applied to a TV, no issue arises. As thermal design, compared to direct type, the LED light source can be concentrated, so there is an advantage that they can be easily cooled.

Moreover, in the embodiment, the case where the light source apparatus is applied to the direct type liquid crystal display is described; however, the invention is not limited to the case, and the invention can be applied to a projection type display. Further, the invention can be applied to not only the transmissive liquid crystal display but also a reflective liquid crystal display. In addition, for example, the light source apparatus can be used for any other applications such as a lighting system as an indoor lighting fixture.

It should be understood by those skilled in the art that various modifications, combinations, sub-combinations and alterations may occur depending on design requirements and other factors insofar as they are within the scope of the appended claims or the equivalents thereof.

What is claimed is:

1. A light source apparatus comprising:
a cold cathode fluorescent tube including a B phosphor for blue and a G phosphor for green;
a light emitting diode for red; and
a light guide plate for forming a surface light source from the light emitting diode such that only the color red emitted by the light emitting diode passes through the light guide plate;
wherein the G phosphor emits a single-spectrum light with a peak wavelength of 510 to 530 nm,
the light emitting diode emits a single-spectrum light with a peak wavelength of 620 to 650 nm, and
at least a portion of the light emitting diode being arranged along an edge of the light guide plate.

2. The light source apparatus according to claim 1, wherein
A mercury (Hg) gas is sealed in the cold cathode fluorescent tube as an excitation gas, and
the G phosphor emits a single-spectrum light with a peak wavelength of 510 to 520 nm.

3. The light source apparatus according to claim 1, wherein
an ultraviolet excitation gas not generating an emission line spectrum in a wavelength range of visible light is sealed in the cold cathode fluorescent tube as an excitation gas, and
the G phosphor emits a single-spectrum light with a peak wavelength of 510 to 530 nm.

4. The light source apparatus according to claim 3, wherein the ultraviolet excitation gas is a xenon (Xe) gas.

5. The light source apparatus according to claim 4, wherein the G phosphor emits a single-spectrum light with a peak wavelength of 520 to 530 nm.

6. A liquid crystal display comprising:
a light source apparatus: and
a liquid crystal display device displaying an image through the use of light emitted from the light source apparatus as transillumination light,
wherein the light source apparatus includes:
a cold cathode fluorescent tube including a B phosphor for blue and a G phosphor for green;
a light emitting diode for red; and
a light guide plate for forming a surface light source from the light emitting diode such that only the color red emitted by the light emitting diode passes through the light guide plate;
wherein
the G phosphor emits a single-spectrum light with a peak wavelength of 510 to 530 nm,
the light emitting diode emits a single-spectrum light with a peak wavelength of 620 to 650 nm, and
at least a portion of the light emitting diode being arranged along an edge of the light guide plate.

7. A light source apparatus as a backlight source for a liquid crystal display device, the liquid crystal display device including a blue filter, a green filter and a red filter for displaying a color image, the light source apparatus comprising:
a cold cathode fluorescent tube including a B phosphor for blue and a G phosphor for green; and
a light emitting device for red, arranged at a distance from the cold cathode fluorescent tube, the distance enabling color mixture of lights;
a diffusing member, diffusing color light emitted from the cold cathode fluorescent tube and color light emitted from the light emitting device, thereby uniforming an intensity distribution of white light as a resultant of color mixture of lights; and
a light guide plate for forming a surface light source from the light emitting diode such that only the color red emitted by the light emitting diode passes through the light guide plate;
wherein the peak wavelength of spectrum light of the light emitting device for red is located outside the transmission wavelength range of the green filter, and
at least a portion of the light emitting diode being arranged along an edge of the light guide plate.

8. A liquid crystal display comprising:
a liquid crystal display device including a blue filter, a green filter and a red filter to display a color image; and
a light source apparatus as a backlight source for the liquid crystal display device,
wherein the light source apparatus includes:
a cold cathode fluorescent tube including a B phosphor for blue and a G phosphor for green;
a light emitting device for red, arranged at a distance from the cold cathode fluorescent tube, the distance enabling color mixture of lights;
a diffusing member diffusing color light emitted from the cold cathode fluorescent tube and color light emitted from the light emitting device, thereby uniforming an intensity distribution of white light as a resultant of color mixture of lights; and
a light guide plate for forming a surface light source from the light emitting diode such that only the color red emitted by the light emitting diode passes through the light guide plate;
wherein the peak wavelength of spectrum light of the light emitting device for red is located outside the transmission wavelength range of the green filter, and
at least a portion of the light emitting diode being arranged along an edge of the light guide plate.

* * * * *